US011501651B2

(12) United States Patent
Yamada et al.

(10) Patent No.: US 11,501,651 B2
(45) Date of Patent: Nov. 15, 2022

(54) FLIGHT CONTROL APPARATUS AND FLIGHT CONTROL SYSTEM

(71) Applicant: NTT DOCOMO, INC., Tokyo (JP)

(72) Inventors: Takefumi Yamada, Tokyo (JP); Ken Koumoto, Tokyo (JP); Youhei Oono, Tokyo (JP); Hidetoshi Ebara, Toyko (JP); Yuichiro Segawa, Tokyo (JP); Yukiko Nakamura, Toyko (JP)

(73) Assignee: NTT DOCOMO, INC., Tokyo (JP)

( * ) Notice: Subject to any disclaimer, the term of this patent is extended or adjusted under 35 U.S.C. 154(b) by 186 days.

(21) Appl. No.: 16/647,216

(22) PCT Filed: Oct. 30, 2018

(86) PCT No.: PCT/JP2018/040374
§ 371 (c)(1),
(2) Date: Mar. 13, 2020

(87) PCT Pub. No.: WO2019/093198
PCT Pub. Date: May 16, 2019

(65) Prior Publication Data
US 2021/0035459 A1 Feb. 4, 2021

(30) Foreign Application Priority Data

Nov. 9, 2017 (JP) .............................. JP2017-216451

(51) Int. Cl.
*G08G 5/04* (2006.01)
*G05D 1/10* (2006.01)
(Continued)

(52) U.S. Cl.
CPC ........... *G08G 5/045* (2013.01); *B64C 39/024* (2013.01); *G05D 1/1064* (2019.05);
(Continued)

(58) Field of Classification Search
None
See application file for complete search history.

(56) References Cited

U.S. PATENT DOCUMENTS 9,847,034 B1 * 12/2017 Plawecki ............. G08G 5/0039
2016/0140851 A1 * 5/2016 Levy .................... G08G 5/0034
701/410
(Continued)

FOREIGN PATENT DOCUMENTS

JP 2004175209 A 6/2004
JP 2009205652 A 9/2009
(Continued)

OTHER PUBLICATIONS

D. Sislak, M. Rehak, M. Pechoucek, D. Pavlicek and M. Uller, "Negotiation-Based Approach to Unmanned Aerial Vehicles," IEEE Workshop on Distributed Intelligent Systems: Collective Intelligence and Its Applications (DIS'06), 2006, pp. 279-284, doi: 10.1109/DIS.2006.55. (Year: 2006).*

(Continued)

*Primary Examiner* — Sze-Hon Kong
*Assistant Examiner* — Davin Seol
(74) *Attorney, Agent, or Firm* — Dilworth IP, LLC (57) ABSTRACT

A flight control apparatus includes a detection unit that detects within a predetermined range of an air vehicle another air vehicle. A specifying unit specifies a type of the detected other air vehicle. A determining unit determines a possibility that the air vehicle and the other air vehicle will collide, based on an attribute relating to movement of the other air vehicle. When it is determined that a possibility of collision exists, a flight control unit controls the flight of the air vehicle according to the specified type of the other air vehicle to avoid collision with the other air vehicle.

15 Claims, 6 Drawing Sheets

(51) Int. Cl.
*B64C 39/02* (2006.01)
*G08G 5/00* (2006.01)

(52) U.S. Cl.
CPC ...... *G08G 5/0039* (2013.01); *B64C 2201/027* (2013.01); *B64C 2201/042* (2013.01); *B64C 2201/108* (2013.01); *B64C 2201/141* (2013.01)

(56) References Cited

U.S. PATENT DOCUMENTS

| | | | | |
|---|---|---|---|---|
| 2017/0045894 | A1* | 2/2017 | Canoy | G08G 5/0013 |
| 2017/0092138 | A1* | 3/2017 | Trundle | G08G 5/0069 |
| 2018/0033318 | A1* | 2/2018 | Yeh | G05D 1/0088 |
| 2018/0307907 | A1* | 10/2018 | Ichihara | G06K 9/00664 |
| 2019/0317530 | A1* | 10/2019 | Yang | G08G 5/0069 |
| 2021/0358311 | A1* | 11/2021 | Tantardini | G01S 13/91 |

FOREIGN PATENT DOCUMENTS

| | | | |
|---|---|---|---|
| JP | 6730585 | B2 * | 7/2020 |
| WO | 2016154942 | A1 | 10/2016 |

OTHER PUBLICATIONS

D. Sislak, P. Volf, A. Komenda, J. Samek and M. Pechoucek, "Agent-Based Multi-Layer Collision Avoidance to Unmanned Aerial Vehicles," 2007 International Conference on Integration of Knowledge Intensive Multi-Agent Systems, 2007, pp. 365-370, doi: 10.1109/KIMAS.2007.369837. (Year: 2007).*

International Search Report issued in corresponding PCT Application No. PCT/JP2018/040374, dated Jan. 16, 2019, 4 pages.

Notice of Reasons for Refusal issued in corresponding Japanese Patent Application No. 2019-552738, dated Mar. 23, 2021.

* cited by examiner

| IDENTIFIER | FLIGHT PLAN ||||||| PRIORITY LEVEL OF FLIGHT PURPOSE |
| --- | --- | --- | --- | --- | --- | --- | --- | --- |
| | DEPARTURE POINT | WAYPOINT | DESTI-NATION POINT | FLIGHT PATH | SCHEDULED DEPARTURE TIME | SCHEDULED ARRIVAL TIME | FLIGHT SPEED | |
| D001 | P1 | P2 | P3 | R1 | T1 | T2 | V1 | 1 |
| D002 | P4 | P5 | P6 | R2 | T3 | T4 | V2 | 2 |
| ... | ... | ... | ... | ... | ... | ... | ... | ... |

| TYPE | CONDITION | COLLISION POSSIBILITY |
|---|---|---|
| FIRST TYPE | MOVING IN DIRECTION OF APPROACHING | YES |
| THIRD TYPE | MOVING IN DIRECTION OF MOVING AWAY | NO |
| SECOND TYPE | FLIGHT PATHS OVERLAP AT THE SAME TIME | YES |
| | FLIGHT PATHS DO NOT OVERLAP AT THE SAME TIME | NO |

FIG. 8

FLIGHT CONTROL APPARATUS AND FLIGHT CONTROL SYSTEM

TECHNICAL FIELD

The present invention relates to a technique for controlling flight of air vehicles.

BACKGROUND

Techniques for controlling flight of air vehicles are known. For example, Japanese Patent Application No. JP 2009-205652A discloses that an area in which moving objects often encounter each other is specified based on information relating to a position of a moving object and information relating to whether or not another moving object is present, and a movement plan is generated so as to avoid that area.

SUMMARY OF INVENTION

Unmanned air vehicles such as drones encompass an air vehicle that can fly according to a predetermined flight plan without being steered by a person. The flight of this kind of air vehicle is generally managed at a predetermined institution. Incidentally, various types of air vehicles, including an air vehicle whose flight is managed at a predetermined institution, and an air vehicle whose flight is not managed, such as a drone that flies according to steering performed by an individual, fly in an airspace. For this reason, during flight, an air vehicle performs collision avoidance in some cases so as not to collide with these other various types of air vehicles. However, depending on the type of the other air vehicle, even if the other air vehicle is present within a predetermined range, it is better to perform collision avoidance in some cases, and it is not necessary to perform collision avoidance in some cases.

According to the present invention, a flight control apparatus is provided that includes: a detection unit configured to detect within a predetermined range of an air vehicle another air vehicle; a specifying unit configured to specify a type of the detected other air vehicle; a determining unit configured to determine a possibility that the air vehicle and the other air vehicle will collide, based on an attribute relating to movement of the other air vehicle; and a flight control unit configured to, when it is determined that there is the possibility of collision, avoid collision with the other air vehicle by controlling flight of the air vehicle according to the specified type.

The flight control apparatus may further include a measurement unit configured to measure a movement direction of the other air vehicle as viewed from the air vehicle, wherein when a predetermined condition is satisfied, the specifying unit may specify a first type as the type of the other air vehicle, when the first type is specified, and the measured movement direction is a direction approaching the air vehicle, the determining unit may determine that there is the possibility that the air vehicle and the other air vehicle will collide, and when the first type is specified, and it is determined that there is the possibility of collision, the flight control unit may avoid collision with the other air vehicle by controlling the flight of the air vehicle.

The predetermined condition may include a condition that an identification signal is not received from the other air vehicle.

The flight control unit may control the flight of the air vehicle in accordance with a first flight plan in which a flight path and a flight period of the air vehicle are described, the flight control apparatus may further include an acquisition unit configured to acquire, from a server apparatus, a second flight plan in which a flight path and a flight period of the other air vehicle are described, and a priority level of a flight purpose in the second flight plan, the specifying unit may specify a second type as the type of the other air vehicle when the second flight plan and the priority level are acquired, when the second type is specified, and flight paths overlap at the same time between the first flight plan and the second flight plan, the determining unit may determine that there is the possibility that the air vehicle and the other air vehicle will collide, and when the second type is specified, and it is determined that there is the possibility of collision, the flight control unit may avoid collision with the other air vehicle by controlling the flight of the air vehicle according to a relationship between the acquired priority level and a priority level of a flight purpose in the first flight plan.

The flight control apparatus may further include a reception unit configured to receive an identification signal from the other air vehicle, wherein the acquisition unit may transmit the received identification signal to the server apparatus.

The flight control apparatus may further include a measurement unit configured to measure a movement direction of the other air vehicle as viewed from the air vehicle, wherein the acquisition unit may transmit, to the server apparatus, a request inquiring as to whether the other air vehicle is under predetermined management, the specifying unit may specify the first type as the type of the other air vehicle when a response indicating that the other air vehicle is not under the predetermined management is received from the server apparatus in response to the request, when the first type is specified, and the measured movement direction is a direction approaching the air vehicle, the determining unit may determine that there is the possibility that the air vehicle and the other air vehicle will collide, and when the first type is specified, and it is determined that there is the possibility of collision, the flight control unit may avoid collision with the other air vehicle by controlling the flight of the air vehicle.

The flight control apparatus may further include a measurement unit configured to measure a movement direction of the other air vehicle as viewed from the air vehicle, wherein the acquisition unit may acquire status information indicating a flight status of the other air vehicle from the server apparatus, when the second flight plan, the priority level, and the status information are acquired, and the status information indicates that the other air vehicle is deviating from the second flight plan, the specifying unit may specify a third type as the type of the other air vehicle, when the third type is specified, and the measured movement direction is a direction approaching the air vehicle, the determining unit may determine that there is the possibility that the air vehicle and the other air vehicle will collide, regardless of the second flight plan, and when the third type is specified, and it is determined that there is the possibility of collision, the flight control unit may avoid collision with the other air vehicle by controlling the flight of the air vehicle, regardless of the priority level.

The flight control apparatus may further include a prediction unit configured to predict a path along which the other air vehicle is to fly, wherein the flight control unit may avoid the predicted path by controlling the flight of the air vehicle.

The flight control apparatus may further include a measurement unit configured to measure a movement direction of the other air vehicle as viewed from the air vehicle at a predetermined time interval, wherein the flight control unit may stop in mid-air until the measured movement direction becomes a direction moving away from the air vehicle.

Also, according to the present invention, a flight control system is provided that includes: a detection unit configured to detect within a predetermined range of an air vehicle another air vehicle; a specifying unit configured to specify a type of the detected other air vehicle;

a determining unit configured to determine a possibility that the air vehicle and the other air vehicle will collide, based on an attribute relating to movement of the other air vehicle; and a flight control unit configured to, when it is determined that there is the possibility of collision, avoid collision with the other air vehicle by controlling flight of the air vehicle according to the specified type.

According to the present invention, it is possible to perform collision avoidance according to the type of the other air vehicle.

DETAILED DESCRIPTION

The following describes an embodiment of the present invention with references to the drawings.

Figure 1:
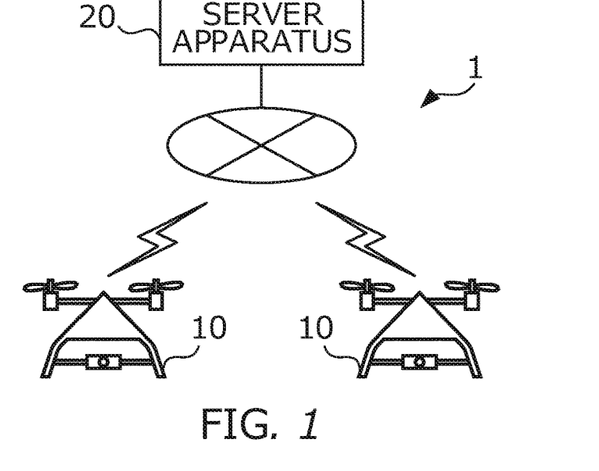
FIG. 1 is a diagram showing an example of a configuration of flight control system 1, in accordance to the present invention.

FIG. 1 is a diagram showing an example of a configuration of flight control system 1. Flight control system 1 is a system for controlling flight of air vehicles 10. Flight control system 1 includes multiple air vehicles 10 and server apparatus 20.

Figure 2:
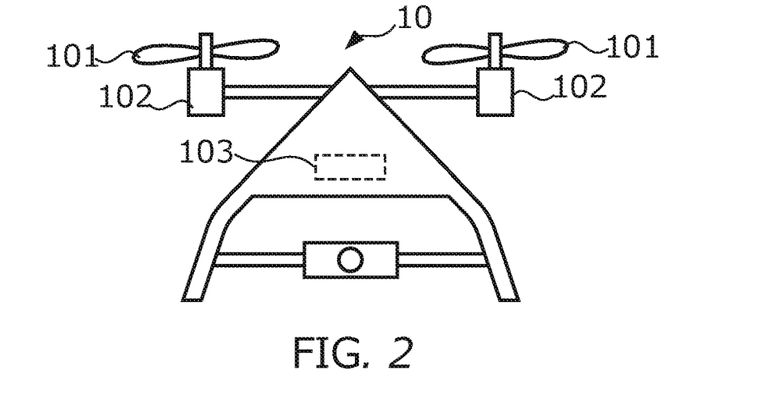
FIG. 2 is a diagram showing an example of an external appearance of air vehicle 10, in accordance to the present invention.

FIG. 2 is a diagram showing an example of the outer appearance of air vehicle 10. Air vehicle 10 is an unmanned aerial vehicle that can autonomously fly without being steered by a person. Air vehicle 10 is a drone, for example. Air vehicle 10 is provided with propellers 101, drive apparatuses 102, and battery 103.

Each propeller 101 rotates about a shaft. As a result of propellers 101 rotating, air vehicle 10 flies. Drive apparatuses 102 supply power to propellers 101 so that they rotate. Drive apparatuses 102 are motors, for example. Drive apparatuses 102 may be directly connected to propellers 101, or may be connected to propellers 101 via transmission mechanisms for transmitting power of drive apparatuses 102 to propellers 101. Battery 103 supplies electric power to the components of air vehicle 10 including drive apparatuses 102.

Figure 3:
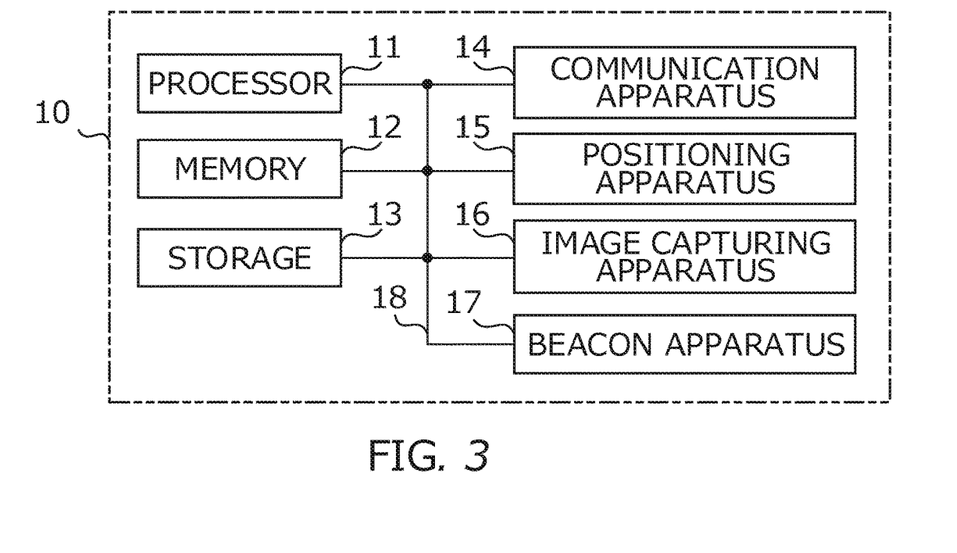
FIG. 3 is a diagram showing a hardware configuration of air vehicle 10, in accordance to the present invention.

FIG. 3 is a diagram showing a hardware configuration of air vehicle 10. Air vehicle 10 may also be physically configured as a computer device that includes processor 11, memory 12, storage 13, communication apparatus 14, positioning apparatus 15, image capturing apparatus 16, beacon apparatus 17, bus 18, and the like. Note that, in the following description, the term "apparatus" may be read as a circuit, a device, a unit, or the like.

Processor 11 activates, for example, an operating system to control the entire computer. Processor 11 may also be constituted by a central processing unit (CPU) that includes an interface with peripheral apparatuses, a control apparatus, an arithmetic apparatus, a register, and the like.

Furthermore, processor 11 reads a program (program code), a software module, or data onto memory 12 from storage 13 and/or communication apparatus 14, and executes various types of processing based thereon. As the program, a program for causing the computer to execute at least part of an operation of air vehicle 10 is used. The various types of processing that are executed in air vehicle 10 may be executed by one processor 11, or may be executed by two or more processors 11 at the same time or successively. One or more chips may also be mounted on processor 11. Note that the program may also be transmitted from a network via a telecommunication line.

Memory 12 is a computer-readable recording medium, and may also be constituted by, for example, at least one of a read only memory (ROM), an erasable programmable ROM (EPROM), an electrically erasable programmable ROM (EEPROM), and a random access memory (RAM). Memory 12 may also be referred to as a register, a cache, a main memory (main storage unit), or the like. Memory 12 can store a program (program code), a software module, and the like that can be executed to perform a flight control method according to an embodiment of the present invention.

Storage 13 is a computer-readable recording medium, and may also be constituted by, for example, at least one of an optical disk such as a compact disc ROM (CD-ROM), a hard disc drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disc, and a magnetic strip. Storage 13 may also be referred to as an auxiliary storage unit.

Communication apparatus 14 is hardware (a transmitting and receiving device) for performing communication with a computer via a wired network and/or a wireless network, and is also referred to as, for example, a network device, a network controller, a network card, a communication module, or the like.

Positioning apparatus 15 measures the three-dimensional position of air vehicle 10. Positioning apparatus 15 is, for example, a global positioning system (GPS) receiver, and measures the current position of air vehicle 10 based on GPS signals received from a plurality of satellites.

Image capturing apparatus 16 captures an image of the surrounding area of air vehicle 10. Image capturing apparatus 16 is a camera for example, and performs image capturing by using an optical system to form an image on an imaging element. Image capturing apparatus 16 may also capture an image using ultrasonic waves. Image capturing apparatus 16 captures, for example, an image of a predetermined range forward of air vehicle 10. Note, however, that the direction in which image capturing apparatus 16 captures an image is not limited to the direction forward of air vehicle 10, and may also be a direction upward, downward, or backward of air vehicle 10. Furthermore, the image capture direction may also be changed, for example, by rotation of a pedestal that supports image capturing apparatus 16.

Beacon apparatus 17 transmits and receives beacon signals with a predetermined frequency. For example, beacon apparatus 17 transmits a beacon signal within a predetermined range at a predetermined time interval. The predetermined range is a range with a radius of 10 m, for example. Also, beacon apparatus 17 receives a beacon signal transmitted from another air vehicle 10. The beacon signal includes an identifier of air vehicle 10 that transmitted the beacon signal.

Furthermore, the apparatuses such as processor 11 and memory 12 are connected to each other via bus 18 for communicating information. Bus 18 may be constituted by a single bus, or may be constituted by buses that are different from each other between the apparatuses.

Figure 4:
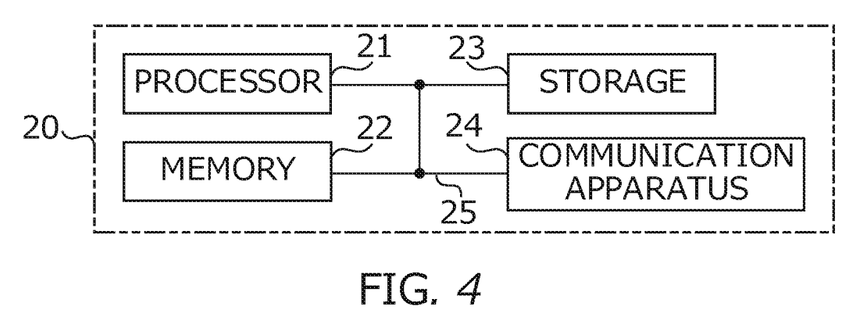
FIG. 4 is a diagram showing a hardware configuration of server apparatus 20, in accordance to the present invention.

FIG. 4 is a diagram showing a hardware configuration of server apparatus 20. Server apparatus 20 functions to perform operation management with respect to air vehicle 10. The term "operation management" means managing air traffic of air vehicle 10. For example, if air vehicle 10 is an unmanned aerial vehicle such as a drone, the operation management includes setting of a flight airspace of air vehicle 10 and control of a flight path. Note, however, that "operation management" is an idea that can encompass not only management of such an unmanned aerial vehicle but also air traffic management of a manned aircraft, namely, keeping track of and performing notification of the entire airspace in which the manned aircraft flies, for example.

Server apparatus 20 may also be physically constituted by a computer device that includes processor 21, memory 22, storage 23, communication apparatus 24, bus 25, and the like. Processor 21, memory 22, storage 23, communication apparatus 24, and bus 25 are the same as above-described processor 11, memory 12, storage 13, communication apparatus 14, and bus 18, and thus descriptions thereof are omitted.

Figure 5:
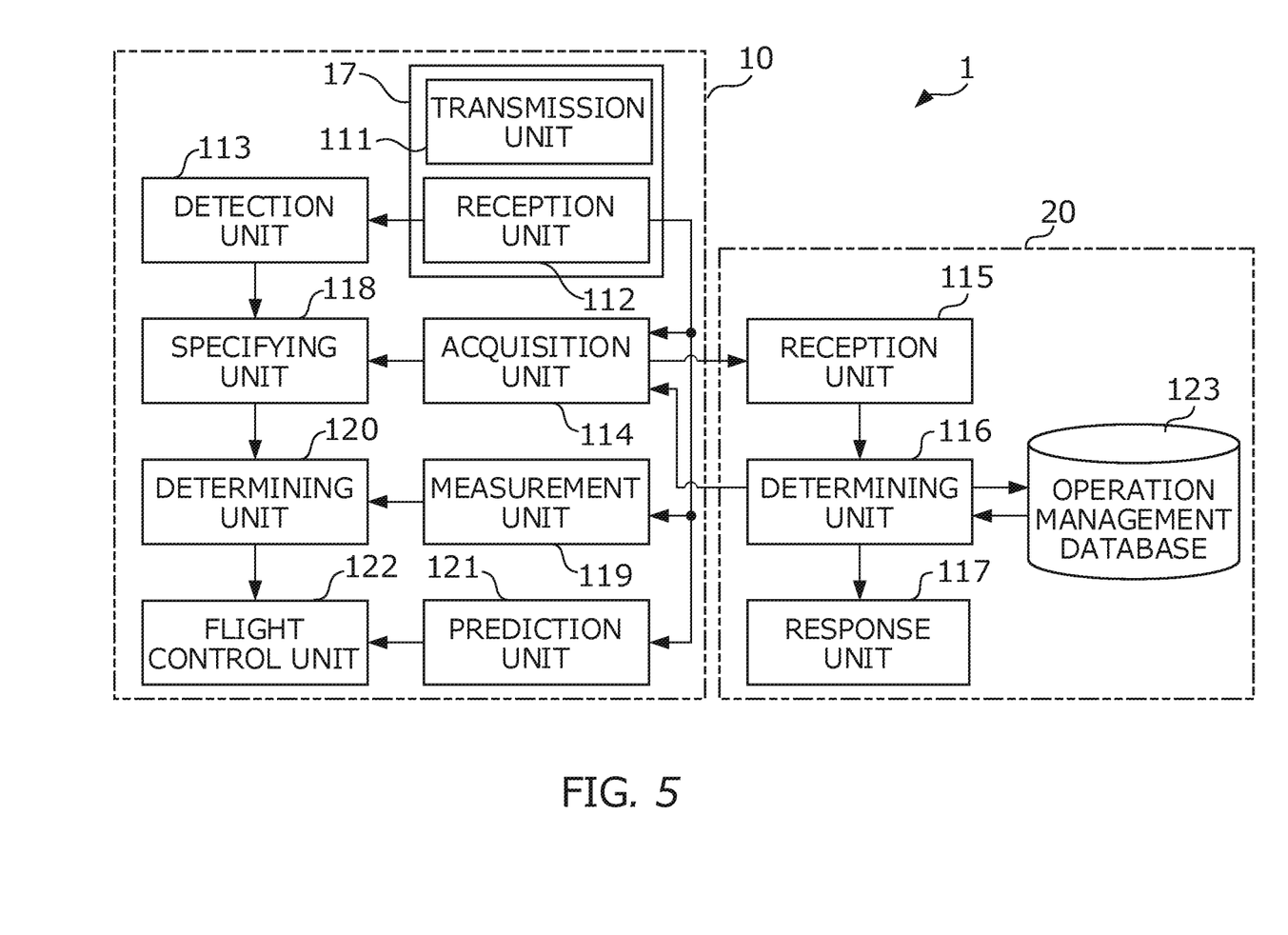
FIG. 5 is a diagram showing an example of a functional configuration of flight control system 1, in accordance to the present invention.

FIG. 5 is a diagram showing an example of a functional configuration of flight control system 1. Flight control system 1 functions as transmission unit 111, reception unit 112, detection unit 113, acquisition unit 114, reception unit 115, determining unit 116, response unit 117, specifying unit 118, measurement unit 119, determining unit 120, prediction unit 121, and flight control unit 122.

In the example shown in FIG. 5, transmission unit 111, reception unit 112, detection unit 113, acquisition unit 114, specifying unit 118, measurement unit 119, determining unit 120, prediction unit 121, and flight control unit 122 are mounted in air vehicle 10. Among these, transmission unit 111 and reception unit 112 are realized by beacon apparatus 17. Detection unit 113, acquisition unit 114, specifying unit 118, measurement unit 119, determining unit 120, prediction unit 121, and flight control unit 122 are realized by reading predetermined software (program) onto hardware such as processor 11 or memory 12, so that processor 11 performs calculation, and controlling communication using communication apparatus 14 and reading and/or writing of data with respect to memory 12 and storage 13. In this case, air vehicle 10 functions as a flight control apparatus.

Also, reception unit 115, determining unit 116, and response unit 117 is mounted in server apparatus 20. Reception unit 115, determining unit 116, and response unit 117 are realized by reading predetermined software (program) onto hardware such as processor 21 or memory 22, so that processor 21 performs calculation, and controlling communication using communication apparatus 24 and reading and/or writing of data with respect to memory 22 and storage 23.

Transmission unit 111 transmits an identification signal within a predetermined range from air vehicle 10. The identification signal is a signal that identifies air vehicle 10. For example, the identification signal is a beacon signal that includes the identifier of air vehicle 10.

Reception unit 112 receives an identification signal transmitted from other air vehicle 10. The identification signal is a signal that identifies other air vehicle 10. For example, the identification signal is a beacon signal that includes the identifier of other air vehicle 10.

Detection unit 113 detects other air vehicle 10 that is present within a predetermined range from air vehicle 10. This detection may also be performed according to whether or not the identification signal has been received from other air vehicle 10, for example.

If other air vehicle 10 is under predetermined management, acquisition unit 114 acquires, from server apparatus 20, the flight plan of other air vehicle 10, the priority level of the flight purpose of the flight plan, and status information indicating the flight status of other air vehicle 10. Being "under predetermined management" means that flight is being managed using server apparatus 20 in a predetermined institution, for example. For example, acquisition unit 114 transmits, to server apparatus 20, a request inquiring about whether or not other air vehicle 10 is under predetermined management. Reception unit 115 receives the request from air vehicle 10. Determining unit 116 determines whether or not other air vehicle 10 is under predetermined management by referencing operation management database 123.

Figure 6:
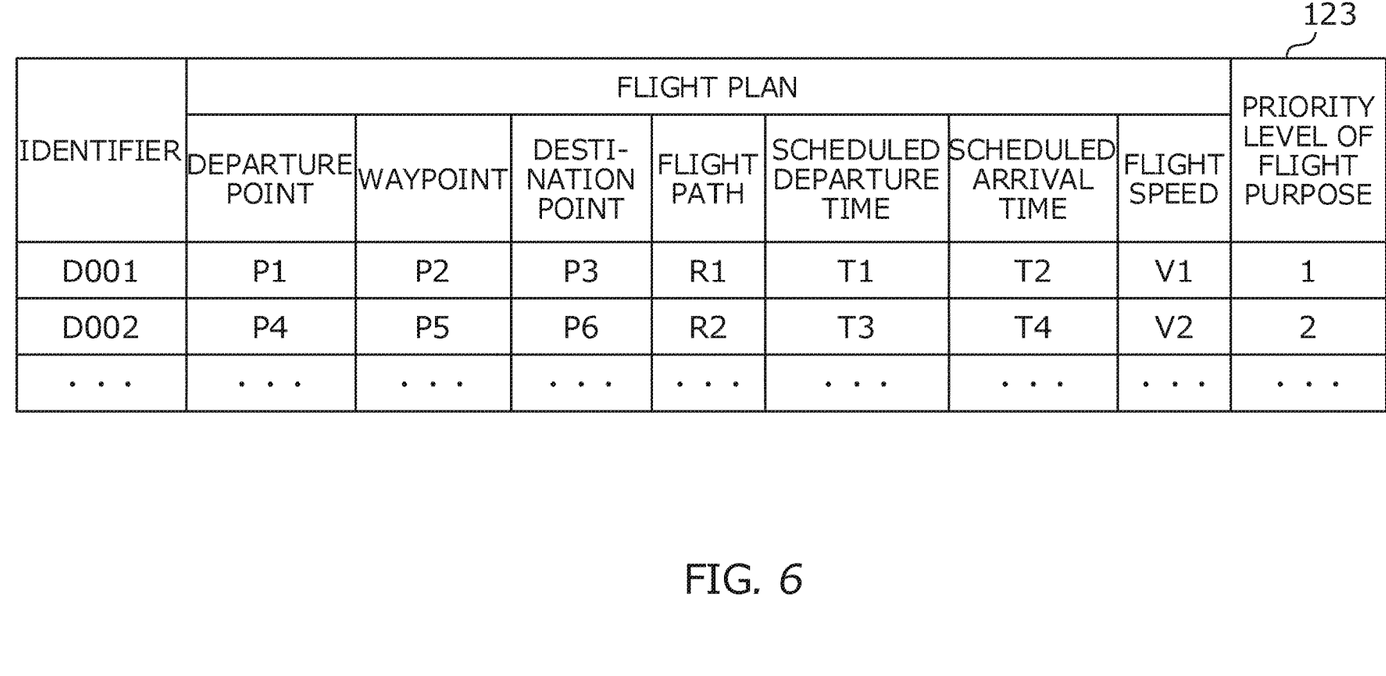
FIG. 6 is a diagram showing an example of operation management database 123, in accordance to the present invention.

FIG. 6 is a diagram showing an example of operation management database 123. Operation management database 123 is stored in storage 23, for example. The identifiers of air vehicles 10, the flight plan of air vehicle 10, and the priority level of the flight purpose in the flight plan are stored in association with each other in operation management database 123. Only the identifiers of air vehicles 10 that are under predetermined management are included in operation management database 123. That is, the identifier of air vehicle 10 that is not under predetermined management is not included in operation management database 123.

"Flight plan" means information indicating a plan of flight. A departure point, a waypoint, a destination point, a flight path, a scheduled departure time, a scheduled arrival time, and a flight speed of air vehicle 10 are described in the flight plan. Note that if the airspace through which air vehicle 10 flies is divided into multiple three-dimensional spaces (hereinafter referred to as "airspace cells"), the departure point, waypoint, destination point, and flight path may be indicated according to the airspace cell. The scheduled departure time and the scheduled arrival time indicate the flight period. For example, the time period from the scheduled departure time to the scheduled arrival time is the flight period. The priority level of the flight purpose indicates the level of priority of the flight purpose. For example, if air vehicle 10 flies in order to deliver cargo, the priority level may be higher the higher the importance of the cargo or the urgency of the delivery is. In another example, if air vehicle 10 flies in order to respond to an incident or an accident, the priority level may be higher. In the example shown in FIG. 6, the priority level is indicated by the numbers "1" to "3". The priority level "1" indicates that the priority level of the flight is the highest, and the priority level "3" indicates that the priority level of the flight is the lowest. However, the expression of the priority level is not limited to this example. The priority level may also be expressed using symbols other than numbers.

Response unit 117 transmits a response indicating the result of the determining performed by determining unit 116 to air vehicle 10. Also, if it is determined by determining unit 116 that other air vehicle 10 is under predetermined management, the response includes the flight plan of other air vehicle 10, the priority level of the flight purpose in the flight plan, and status information indicating the flight status of other air vehicle 10.

Specifying unit 118 specifies the type of other air vehicle 10 detected by detection unit 113. The specifying may be performed based on the response transmitted from response unit 117, for example. The "type" refers to a distinction made according to a type corresponding to the management status and flight status of air vehicle 10. The type includes a first type to a third type. The first type is a type to which air vehicle 10 belongs if air vehicle 10 is not under the predetermined management. The second type is a type to which air vehicle 10 belongs if air vehicle 10 is under the predetermined management and flies in accordance with the flight plan. The third type is a type to which air vehicle 10 belongs if air vehicle 10 is under the predetermined management and but flies deviating from the flight plan.

Measurement unit 119 measures the movement direction of other air vehicle 10, as viewed from air vehicle 10. The measurement of the movement direction may also be performed based on a change in the intensity of an identification signal received from other air vehicle 10 by reception unit 112, for example.

Determining unit 120 determines the possibility that air vehicle 10 and other air vehicle 10 will collide, based on the attribute relating to the movement of other air vehicle 10. The "attribute relating to the movement" refers to information relating to movement. The concept of "attribute relating to movement" encompasses the movement direction measured by measurement unit 119 and a flight plan acquired by acquisition unit 114. Also, different information may be used as the attribute relating to the movement, according to the type of other air vehicle 10 specified by specifying unit 118. For example, if the first type or the third type is specified by specifying unit 118, the movement direction measured by measurement unit 119 may also be used as the attribute relating to the movement. On the other hand, if the second type is specified by specifying unit 118, the flight plan acquired by acquisition unit 114 may also be used as the attribute relating to the movement.

Prediction unit 121 predicts the path along which other air vehicle 10 is to fly. Prediction of the path may also be performed based on the identification signal of other air vehicle 10 received by reception unit 112, for example.

Flight control unit 122 essentially controls drive apparatus 102 to cause air vehicle 10 to fly in accordance with the predetermined flight plan. Drive apparatus 102 performs driving under flight control unit 122, whereby propeller 101 rotates, causing air vehicle 10 to fly. However, if it is determined by determining unit 120 that there is a possibility of collision, flight control unit 122 avoids collision with other air vehicle 10 by controlling the flight of air vehicle 10 according to the type specified by specifying unit 118.

For example, if the first type or the third type is specified by specifying unit 118, when it is determined by determining unit 120 that there is a possibility of collision, collision avoidance may also be performed based on the path predicted by prediction unit 121. On the other hand, if the second type is specified by specifying unit 118, when it is determined by determining unit 120 that there is a possibility of collision, collision avoidance may also be performed according to the relationship between the priority level of the flight purpose of other air vehicle 10 acquired by acquisition unit 114 and the priority level of the flight purpose of air vehicle 10.

Note that, in the following description, if air vehicle 10 is described as the subject of processing, it is meant that the processing is executed specifically by reading predetermined software (program) onto hardware such as processor 11 or memory 12 so that processor 11 performs calculation, and controlling communication using communication apparatus 14 and reading and/or writing of data with respect to memory 12 and storage 13. The same applies to server apparatus 20.

Figure 7:
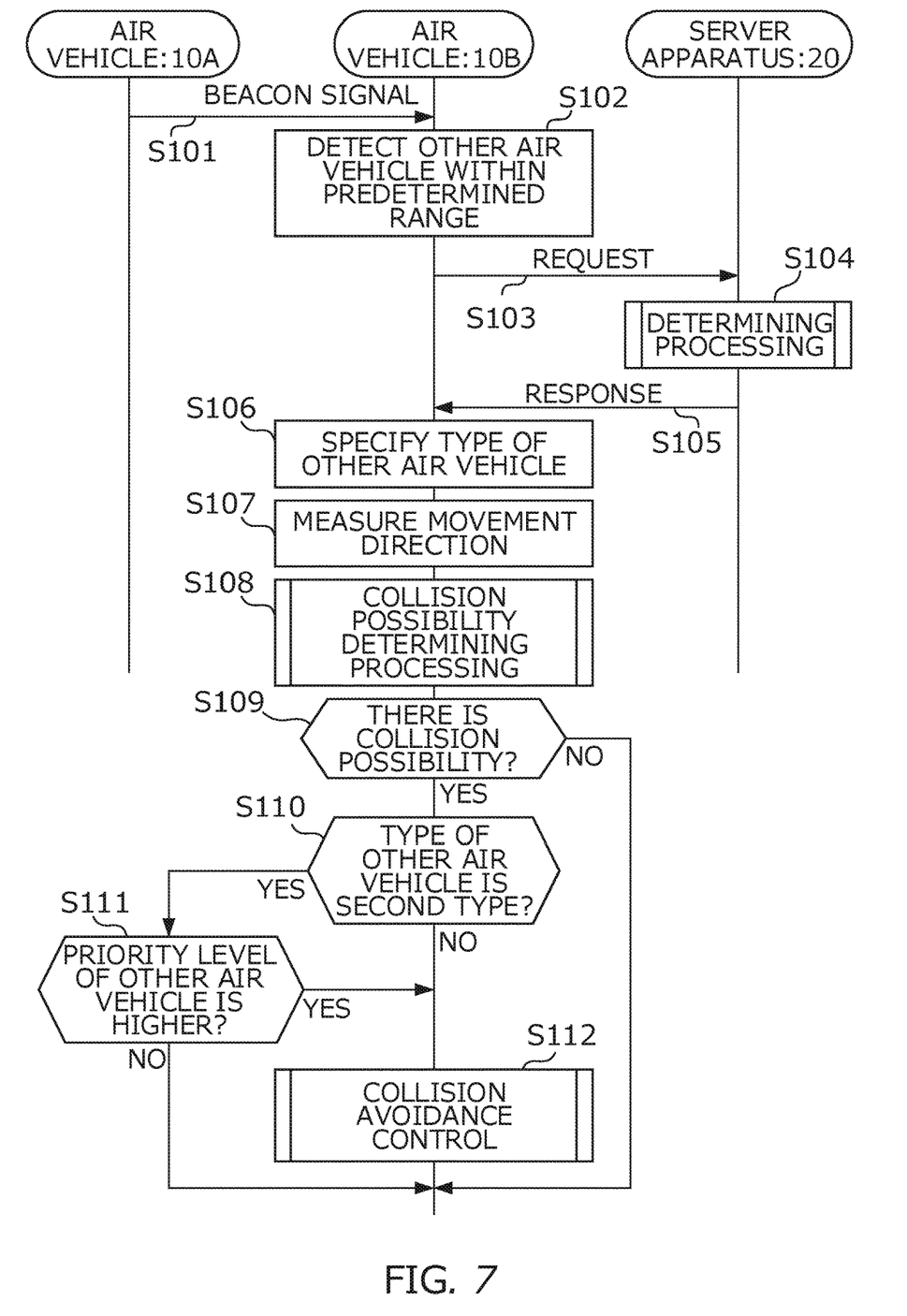
FIG. 7 is a sequence chart showing an example of operations of flight control system 1, in accordance to the present invention.

FIG. 7 is a sequence chart showing an example of an operation of flight control system 1. Here, a case is envisioned in which multiple air vehicles 10 include air vehicles 10A and 10B. Before flight, to each air vehicle 10, the flight plan and the priority level of the flight purpose of that air vehicle 10, which are included in operation management database 123, are transmitted from server apparatus 20 and are stored in storage 13. Then, each air vehicle 10 flies in accordance with its flight plan. For example, storage 13 of air vehicle 10B stores the flight plan (an example of a first flight plan) and a priority level of a flight purpose, which are stored in association with an identifier "D002" of are vehicle 10B in operation management database 123 shown in FIG. 6. Air vehicle 10B departs from a departure point "P4" at a scheduled departure time "T3" in accordance with the flight plan, and thereafter flies at a flight speed "V2" through a flight path "R2", passes through a waypoint "P5", and flies so as to arrive at a destination point "P6" at a scheduled arrival time "T4".

Also, during flight, air vehicles 10 each measure their current position at a predetermined time interval using positioning apparatus 15, and transmit position information indicating the measured current positions to server apparatus 20. Server apparatus 20 keeps track of the flight statuses of air vehicles 10 based on the position information received from air vehicles 10 and the flight plans of air vehicles 10 included in operation management database 123.

Furthermore, during flight, air vehicles 10 transmit beacon signals from transmission units 111 at a predetermined time interval. Here, a case is envisioned in which air vehicle 10A is present within a predetermined range from air vehicle 10B. In this case, when the beacon signal is transmitted from air vehicle 10A, the beacon signal reaches air vehicle 10B.

In step S101, reception unit 112 of air vehicle 10B receives the beacon signal transmitted from other air vehicle 10A within the predetermined range. Identifier "D001" of air vehicle 10A is included in the beacon signal.

In step S102, since the identifier "D001" of air vehicle 10A is included in the beacon signal received in step S101, detection unit 113 of air vehicle 10B detects other air vehicle 10A, which is within the predetermined range.

In step S103, acquisition unit 114 of air vehicle 10B transmits, to server apparatus 20, a request inquiring whether or not other air vehicle 10A detected in step S102 is under the predetermined management. This request includes the identifier "D001", which is included in the beacon signal received in step S101. Reception unit 115 of server apparatus 20 receives the request from air vehicle 10B.

In step S104, determining unit 116 of server apparatus 20 performs processing for determining whether or not air vehicle 10A is under the predetermined management by referencing operation management database 123. Specifically, determining unit 116 determines whether or not the identifier included in the request is included in operation management database 123.

For example, if the identifier "D001" of air vehicle 10A is not included in operation management database 123, it is determined that air vehicle 10A is not under the predetermined management. On the other hand, in the example shown in FIG. 6, the identifier "D001" of air vehicle 10A is included in operation management database 123. In this case, it is determined that air vehicle 10A is under the predetermined management.

Also, if it is determined that air vehicle 10A is under the predetermined management, status information indicating the flight status of air vehicle 10A is generated. This status information is information indicating whether or not air vehicle 10A is flying in accordance with the flight plan, for example, and is generated based on the position information received from air vehicle 10A and the flight plan of air vehicle 10A included in operation management database 123.

In the example shown in FIG. 6, if the position information received from air vehicle 10A indicates a position on flight path "R1", it is determined that air vehicle 10A is flying in accordance with the flight plan. In this case, status information indicating that air vehicle 10A is flying in accordance with the flight plan is generated. On the other hand, if the position information received from air vehicle 10A indicates a position located away from flight path "R1", it is determined that air vehicle 10A is flying deviating from the flight plan. In this case, status information indicating that air vehicle 10A is flying deviating from the flight plan is generated.

In step S105, response unit 117 of server apparatus 20 transmits, to air vehicle 10B, a response to the request received in step S103. The result of the determining of step S104 is included in this response. Also, if it is determined that air vehicle 10A is under the predetermined management, the response further includes the flight plan (an example of a second flight plan) of air vehicle 10A, the priority level of the flight purpose in the flight plan, and the status information indicating the flight status of air vehicle 10A. For example, if air vehicle 10A is under the predetermined management and is flying in accordance with the flight plan, a response including a determining result indicating that air vehicle 10A is under the predetermined management, the flight plan and priority level "1" of the flight purpose, which are associated with the identifier "D001" of air vehicle 10A in operation management database 123 shown in FIG. 6, and the status information indicating that air vehicle 10A is flying in accordance with the flight plan is transmitted to air vehicle 10B. Acquisition unit 114 of air vehicle 10B receives a response from server apparatus 20. The flight plan of air vehicle 10A, the priority level of the flight purpose, and the status information of air vehicle 10A, which are included in the response, are stored in storage 13 of air vehicle 10B.

In step S106, specifying unit 118 of air vehicle 10B specifies the type of other air vehicle 10A based on the response received from server apparatus 20 in step S105. For example, if a determining result indicating that air vehicle 10A is not under the predetermined management is included in the response, the first type is determined as the type of air vehicle 10A. On the other hand, if a determining result indicating that air vehicle 10A is under the predetermined management and status information indicating that air vehicle 10A is flying in accordance with the flight plan are included in the response received in step S105, the second type is determined as the type of air vehicle 10A. Also, if a determining result indicating that air vehicle 10A is under the predetermined management and status information indicating that air vehicle 10A is flying deviating from the flight plan are included in the response received in step S105, the third type is determined as the type of air vehicle 10A.

In step S107, measurement unit 119 of air vehicle 10B measures the movement direction of other air vehicle 10A as viewed from air vehicle 10B, based on a change in the intensity of the beacon signal received from air vehicle 10A. As long as air vehicle 10A is within a predetermined range from air vehicle 10B, the beacon signal is received from air vehicle 10A at a predetermined interval. If the intensity of the beacon signal received from air vehicle 10A increases, for example, the direction of approaching air vehicle 10B is measured. On the other hand, if the intensity of the beacon signal received from air vehicle 10A decreases, the direction of moving away from air vehicle 10B is measured.

In step S108, determining unit 120 of air vehicle 10B performs processing for determining the possibility that other air vehicle 10A will collide with air vehicle 10B. The method of determining this collision possibility differs depending on the type of air vehicle 10A specified in step S106.

Figure 8:
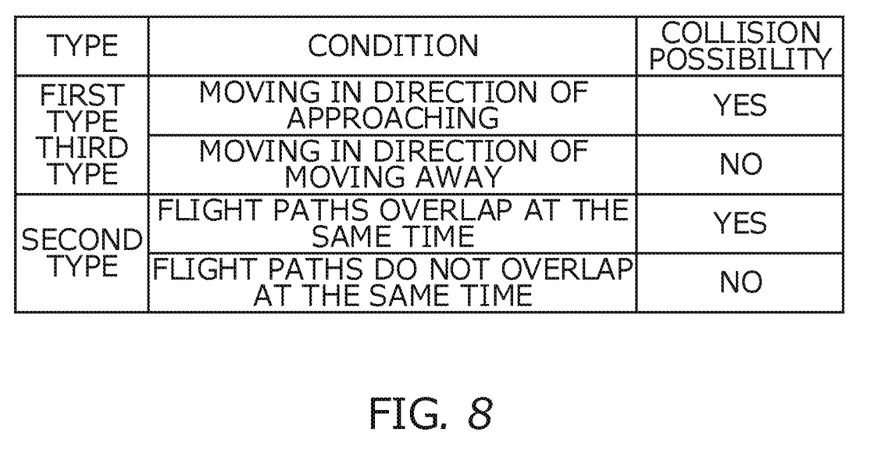
FIG. 8 is a diagram showing an example of a collision possibility determining method, in accordance to the present invention.

FIG. 8 is a diagram showing an example of a collision possibility determining method. In this example, if air vehicle 10A belongs to the first type or the third type, when the movement direction measured in step S107 is the direction of approaching air vehicle 10B, it is determined that there is a collision possibility. On the other hand, in this case, when the movement direction measured in step S107 is the direction of moving away from air vehicle 10B, it is determined that there is no collision possibility.

If air vehicle 10A belongs to the second type, when the flight paths overlap at the same time between the flight plan of air vehicle 10A and the flight plan of air vehicle 10B stored in storage 13, it is determined that there is a collision possibility. On the other hand, in this case, when the flight paths do not overlap at the same time between the flight plan of air vehicle 10A and the flight plan of air vehicle 10B stored in storage 13, it is determined that there is no collision possibility.

In the example shown in FIG. 6, if flight path "R1" described in the flight plan of air vehicle 10A and flight path "R2" described in the flight plan of air vehicle 10B overlap at the same time, it is determined that there is a collision possibility. The "flight paths overlapping" means that at least portions of the flight paths overlap. The concept of "flight paths overlapping" encompasses a state in which the flight paths match, a state in which portions of the flight paths match, and a state in which the flight paths cross. Also, if the flight path is expressed using multiple continuous airspace cells, the concept of "flight paths overlapping" encompasses a state in which flight is scheduled in the same airspace cell at the same time. On the other hand, if the flight paths do not overlap at the same time between the flight plan of air vehicle 10A and the flight plan of air vehicle 10B, it is determined that there is no collision possibility.

In step S109, determining unit 120 of air vehicle 10B determines whether or not there is a possibility that other air vehicle 10A will collide with air vehicle 10B. If it is determined in above-described step S108 that there is a collision possibility (a determination of YES in step S109), the processing advances to step S110. On the other hand, if it is determined in above-described step S108 that there is no collision possibility (a determination of NO in step S109), the processing ends.

In step S110, flight control unit 122 of air vehicle 10B determines whether or not the type of air vehicle 10A specified in step S106 is the second type. For example, if the type of air vehicle 10A is the first type or the third type, the processing advances to step S112. On the other hand, if the type of air vehicle 10A is the second type, the processing advances to step S111.

In step S111, flight control unit 122 of air vehicle 10B determines whether or not the priority level of the flight purpose of other air vehicle 10A is higher than the priority level of the flight purpose of air vehicle 10B. For example, if the priority level of the flight purpose of air vehicle 10A is lower than the priority level of the flight purpose of air vehicle 10B (a determination of NO in step S111), the processing ends. On the other hand, in the example shown in FIG. 6, the priority level of the flight purpose of air vehicle 10A is "1", which is higher than the priority level "2" of the flight purpose of air vehicle 10B (a determination of YES in step S111). In this case, the processing advances to step S112.

In step S112, flight control unit 122 of air vehicle 10B performs collision avoidance control for controlling the flight of air vehicle 10B in order to avoid collision with other air vehicle 10A. The method of collision avoidance control may differ according to the type of other air vehicle 10.

For example, if the type of air vehicle 10A specified in step S106 is the first type or the third type, prediction unit 121 predicts the flight path of air vehicle 10A based on the beacon signal received from air vehicle 10A. For example, prediction unit 121 measures the movement direction and the movement speed of air vehicle 10A based on the change in the intensity of the beacon signal and the reception interval of the beacon signal. Next, prediction unit 121 predicts the flight path in the case where air vehicle 10A flies in the same movement direction at the same movement speed, based on the measured movement direction and movement speed. In this case, flight control unit 122 controls the flight of air vehicle 10B so as to avoid the predicted flight path. For example, flight control unit 122 may change the flight path of air vehicle 10B so as not to overlap with the predicted flight path, and may control drive apparatus 102 so as to fly in accordance with the changed flight path.

On the other hand, if the type of air vehicle 10A specified in step S106 is the second type, flight control unit 122 may control drive apparatus 102 so as to stop in mid-air until air vehicle 10A moves in the direction of moving away. In this case, similarly to above-described step S107, measurement unit 119 of air vehicle 10B measures the movement direction of air vehicle 10A as viewed from air vehicle 10B at a predetermined time interval, based on a change in the intensity of the beacon signal received from air vehicle 10A. Air vehicle 10B stops in mid-air while the movement direction of air vehicle 10A is the direction of approaching air vehicle 10B. On the other hand, when the movement direction of air vehicle 10A changes to the direction of moving away from air vehicle 10B, air vehicle 10B resumes flight in accordance with the flight plan.

Note that in above-described step S111, if the priority level of the flight purpose of air vehicle 10A is lower than the priority level of the flight purpose of air vehicle 10B (a determination of NO in step S111), air vehicle 10B does not perform collision avoidance control. However, if air vehicle 10A belongs to the second type, processing similar to that of air vehicle 10B is performed by air vehicle 10A as well.

Also, in air vehicle 10A, since the priority level of the flight purpose of other air vehicle 10B is higher than the priority level of the flight purpose of air vehicle 10A, the determining in step S111 is YES. In this case, collision avoidance control is performed by air vehicle 10A, and therefore even if air vehicle 10B does not perform collision avoidance control, collision between air vehicle 10A and air vehicle 10B is avoided.

According to the above-described embodiment, if other air vehicle 10 belongs to the first type or the third type, air vehicle 10 performs collision avoidance control when other air vehicle 10 is moving in the direction of approaching. If other air vehicle 10 belongs to the first type or the third type, the flight path of other air vehicle 10 cannot be accurately found out. Also, in this case, there is a possibility that other air vehicle 10 will not perform collision avoidance. Accordingly, when other air vehicle 10 is moving in the direction of approaching air vehicle 10, collision of these air vehicles 10 can be reliably avoided by performing collision avoidance control.

Also, if other air vehicle 10 belongs to the second type, air vehicle 10 performs collision avoidance control when the flight paths overlap at the same time between the flight plan of air vehicle 10 and the flight plan of other air vehicle 10 and the priority level of the flight purpose of other air vehicle 10 is higher than the priority level of the flight purpose of air vehicle 10. For example, if the flight paths do not overlap at the same time between the flight plan of other air vehicle 10 and the flight plan of air vehicle 10, it is thought that there is essentially no possibility that these air vehicles 10 will collide, even if other air vehicle 10 is present within a predetermined range from air vehicle 10. Accordingly, air vehicle 10 does not need to perform collision avoidance control. Also, if other air vehicle 10 is under the predetermined management, processing similar to that of air vehicle 10 will be performed in other air vehicle 10 as well, and therefore when the priority level of the flight purpose of other air vehicle 10 is lower than the priority level of the flight purpose of air vehicle 10, other air vehicle 10 will perform collision avoidance control. Accordingly, air vehicle 10 does not need to perform collision avoidance control.

In this manner, according to the above-described embodiment, collision avoidance according to the type of other air vehicle 10 can be performed. Accordingly, collision between air vehicles 10 can be efficiently avoided.

The present invention is not limited to the above-described embodiment. The above-described embodiment may also be modified as follows. Also, two or more of the following modifications may be carried out in combination with each other.

In the above-described embodiment, multiple air vehicles 10 may include air vehicle 10 that does not transmit a beacon signal, such as a bird. That is, as long as air vehicle 10 flies, it may encompass not only unmanned aerial vehicles such as drones, but also flying animals such as birds, and manned aerial vehicles. In this case, air vehicle may also detect other air vehicle 10 that is present within a predetermined range from air vehicle 10 using an apparatus other than beacon apparatus 17. For example, other air vehicle may also be detected using image capturing apparatus 16 of air vehicle 10 in addition to or instead of beacon apparatus 17. In this case, image recognition is performed on the image captured by image capturing apparatus 16 of air vehicle 10. Other air vehicle 10, which is present within the predetermined range, may also be detected in the case where other air vehicle 10 is recognized in the image as a result of the image recognition. In another example, other air vehicle 10, which is present within a predetermined range from air vehicle 10, may also be detected using an ultrasonic sensor, in addition to or instead of beacon apparatus 17. According to this modification, air vehicle 10 that does not transmit a beacon signal, such as a bird, can also be detected.

Also, if other air vehicle 10 that is present within a predetermined range from air vehicle 10 is detected using beacon apparatus 17 and an apparatus other than beacon apparatus 17, when other air vehicle 10 is detected using only the apparatus other than beacon apparatus 17, specifying unit 118 may specify the first type as the type of other air vehicle 10. That is, if there is no transmission of a beacon signal from other air vehicle 10 and other air vehicle 10 is detected using the apparatus other than beacon apparatus 17, specifying unit 118 may specify the first type as the type of other air vehicle 10. This condition is an example of a predetermined condition. According to this modification, collision with air vehicle 10 that does not transmit a beacon signal, such as a bird, can also be avoided.

In the above-described embodiment, flight control unit 122 may also perform collision avoidance control according to whether or not other air vehicle 10 detected by detection unit 113 has the collision avoidance function. In this case, the response transmitted by response unit 117 includes function information indicating whether or not other air vehicle 10 has a collision avoidance function. If the function information indicates that other air vehicle 10 does not have a collision avoidance function, when it is determined by determining unit 120 that there is a possibility of collision, flight control unit 122 may also perform collision avoidance control regardless of the priority level of the flight purpose.

In the above-described embodiment, the airspace through which air vehicle 10 flies may also include a shared airspace and an exclusive airspace. In the shared airspace, multiple air vehicles 10 can fly at the same time. On the other hand, in the exclusive airspace, only one air vehicle 10 can fly at a time. If the type of other air vehicle 10 specified by specifying unit 118 is the second type, flight control unit 122 may also determine whether or not collision avoidance control is needed, according to whether the airspace through which air vehicle 10 flies is the shared airspace or the exclusive airspace. For example, when air vehicle 10 is flying through the shared airspace in this case, collision avoidance control is performed, whereas when air vehicle 10 is flying through the exclusive airspace, collision avoidance control need not be performed.

In the above-described embodiment, if a flight operation for avoiding collision has been determined in advance, air vehicle 10 may also perform that flight operation when performing collision avoidance control. This flight operation may be an operation of turning in a predetermined direction, or an operation of reducing altitude.

In the above-described embodiment, air vehicle 10 may also transmit a stop signal when stopped in mid-air. The stop signal may be transmitted from beacon apparatus 17, for example. Upon receiving the stop signal from preceding air vehicle 10, following air vehicle 10 may also fly so as to avoid that air vehicle 10.

In the above-described embodiment, if the second type is specified by specifying unit 118, flight control unit 122 may also change the flight path of air vehicle 10 instead of stopping air vehicle 10 in mid-air. In this case, similar to the case where the first type is specified in the above-described embodiment, flight control unit 122 may also change the flight path of air vehicle 10B so as not to overlap with the flight path of other air vehicle 10 predicted by prediction unit 121.

In the above-described embodiment, if the first type or the third type is specified by specifying unit 118, flight control unit 122 may also stop air vehicle 10 in mid-air instead of changing the flight path of air vehicle 10. In this case, similarly to the case where the second type is specified in the above-described embodiment, flight control unit 122 may also stop air vehicle 10 in mid-air until the movement direction of other air vehicle 10 changes to the direction of moving away from air vehicle 10.

In the above-described embodiment, if the priority level of the flight purpose of other air vehicle 10 detected by detection unit 113 and the priority level of the flight purpose of air body 10 are the same, it is also possible to determine whether or not collision avoidance control is needed, in accordance with a predetermined condition. The predetermined condition may be the condition that air vehicle 10 with the later scheduled arrival time performs collision avoidance control, or may be the condition that air vehicle 10 with the higher flight performance performs collision avoidance control, for example.

In the above-described embodiment, determining unit 120 may also determine how likely a collision is instead of whether or not there is a possibility of collision. In this case, if the likelihood of collision determined by determining unit 120 is a predetermined value or more, flight control unit 122 may also perform collision avoidance control according to the type specified by specifying unit 118. In other words, even if it is determined by determining unit 120 that there is a possibility of collision, if the likelihood of collision is smaller than a predetermined value, flight control unit 122 need not perform collision avoidance control.

In the above-described embodiment, the priority level of the flight purpose may also be included in the beacon signal. In this case, flight control unit 122 may also determine whether or not collision avoidance control is needed using the priority level of the flight purpose included in the beacon signal received by reception unit 112.

In the above-described embodiments, the method for measuring the position of air vehicle 10 is not limited to a method using GPS. The position of air vehicle 10 may also be measured using a method not using GPS.

In the above-described embodiments, at least some of the functions of air vehicle 10 may also be equipped in server apparatus 20 or another apparatus. For example, at least one of specifying unit 118, measurement unit 119, determining unit 120, and prediction unit 121 may also be equipped in server apparatus 20. Similarly, at least some of the functions of server apparatus 20 may also be equipped in air vehicle 10 or another apparatus.

The present invention may also be provided as a flight control method that includes processing steps that are executed in flight control system 1. Furthermore, the present invention may also be provided as a program that is executed in air vehicle 10 or server apparatus 20.

The block diagram of FIG. 5 shows blocks per functional units. These functional blocks (configuration units) are realized by an arbitrary combination of hardware and/or software. Furthermore, means for realizing the functional blocks is not particularly limited. In other words, the functional blocks may also be realized by one physically and/or logically coupled apparatus, or a plurality of apparatuses obtained by directly and/or indirectly (for example, in a wired and/or wireless manner) connecting two or more apparatuses that are physically and/or logically separated.

The hardware configuration of air vehicle 10 or server apparatus 20 may also be configured to include one or more apparatuses shown in FIG. 3 or 4, or may also be configured not to include some apparatuses. Furthermore, air vehicle 10 or server apparatus 20 may also be configured to include hardware such as a microprocessor, a DSP (Digital Signal Processor), an ASIC (Application Specific Integrated Circuit), a PLD (Programmable Logic Device), or an FPGA (Field Programmable Gate Array), and some or all of the functional blocks of air vehicle 10 or server apparatus 20 may also be realized by the hardware. For example, processor 11 or 21 may also be implemented by at least one of these pieces of hardware.

Notification of information is not limited to the aspects/embodiments explained in the present description, and may also be performed by another method. For example, notification of information may also be performed by physical layer signaling (for example, downlink control information (DCI) or uplink control information (UCI)), higher-level layer signaling (for example, radio resource control (RRC) signaling, medium access control (MAC) signaling, broadcast information (master information block (MIB) or system information block (SIB))), and other signals, or a combination thereof. Furthermore, RRC signaling may also be referred to as an RRC message, and may also be, for example, an RRC Connection Setup message, an RRC Connection Reconfiguration) message, or the like.

The aspects/embodiments explained in the present description may also be applied to a system using Long Term Evolution (LTE), LTE-Advanced (LTE-A), SUPER3G, IMT-Advanced, 4G, 5G, Future Radio Access (FRA), W-CDMA (registered trademark), GSM (registered trademark), CDMA2000, Ultra Mobile Broadband (UMB), IEEE802.11 (Wi-Fi), IEEE802.16 (WiMAX), IEEE802.20, Ultra-Wide Band (UWB), Bluetooth (registered trademark) or another appropriate system, and/or a next-generation system expanded based on them.

The orders of the processing procedure, sequence, flowchart, and the like of the aspects/embodiments described in the present description may be changed unless they contradict each other. For example, the methods explained in the present description show various step elements in an exemplified order, and are not limited to the shown specific order.

Information and the like may be output from a higher-level layer (or a lower-level layer) to a lower-level layer (or a higher-level layer). Information and the like may also be input/output via a plurality of network nodes.

Input/output information and the like may also be stored in a specific location (for example, a memory), or may also be managed in a management table. Information and the like to be input/output may be overwritten, updated, or added. Output information and the like may also be deleted. Input information and the like may also be transmitted to another apparatus.

Determining may also be conducted using a value expressed by a single bit (0 or 1) or a truth-value (Boolean: true or false), or by comparing numerical values (for example, comparing a value with a predetermined value).

The aspects/embodiments explained in the present description may also be used alone or in combination, or may also be switched when they are implemented. Furthermore, notification of predetermined information (for example, notification of "being X") is not limited to being performed explicitly, and may also be performed implicitly (for example, notification of the predetermined information is not performed).

Software should be broadly interpreted to mean an instruction, an instruction set, a code, a code segment, a program code, a program, a sub program, a software module, an application, a software application, a software package, a routine, a subroutine, an object, an executable file, an execution thread, a procedure, a function and the like, regardless of whether it is referred to as software, firmware, middleware, a microcode, a hardware description language, or another name.

Furthermore, software, an instruction, and the like may also be transmitted/received via a transmission medium. For example, if software is transmitted from a web site, a server, or another remote source, using a wired technology such as a coaxial cable, an optical fiber cable, a twist pair, and a digital subscriber line (DSL), and/or a wireless technology such as infrared light, a radio wave, and a microwave, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned over the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

The terms "system" and "network" used in the present description can be used in an interchangeable manner.

Furthermore, the information and the parameters explained in the present description may also be expressed by absolute values, relative values from a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are in no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The term "based on" used in the present description does not mean "based on only", unless otherwise noted. In other words, the term "based on" means both terms "based on only" and "based on at least".

Any reference to the elements using designations such as "first" and "second" used in the present description does not limit, in general, the amount or order thereof. These nominal signs can be used in the present description as a convenient method for distinguishing between two or more elements. Accordingly, reference to first and second elements does not mean that only two elements can be used here, or that the first element should precede the second element somehow.

The terms "including", "comprising", and any form thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

In the above-described embodiments, it is also possible to determine whether or not air vehicles 10 are flying in accordance with flight plans at a predetermined time interval, regardless of a request from air vehicle 10, and status information may also be generated based on the determining result. In this case, operation management database 123 shown in FIG. 6 includes status information indicating whether or not air vehicles 10 are flying in accordance with flight plans. Also, for example, if air vehicle 10A is determined as being under predetermined management by determining unit 116, the status information of air vehicle 10A may also be extracted and transmitted to air vehicle 10A from operation management database 123.

REFERENCE SIGNS LIST

1 Flight control system
10 Air vehicle
20 Server apparatus
111 Transmission unit
112 Reception unit
113 Detection unit
114 Acquisition unit
115 Reception unit
116 Determining unit
117 Response unit
118 Specifying unit
119 Measurement unit
120 Determining unit
121 Prediction unit
122 Flight control unit

What is claimed is:

1. A flight control apparatus comprising:
a processor configured to:
detect within a predetermined range of an air vehicle another air vehicle;
specify a type of the detected other air vehicle;
determine a possibility that the air vehicle and the other air vehicle will collide, based on an attribute relating to movement of the other air vehicle;
measure a movement direction of the other air vehicle as viewed from the air vehicle; and
when it is determined that there is the possibility of collision, perform collision avoidance control to avoid collision with the other air vehicle by controlling flight of the air vehicle according to the specified type;
perform the collision avoidance control when the specified type is a second type to which the other air vehicle belongs when the other air vehicle is under a predetermined management and flies in accordance with a flight plan, the other air vehicle has a first priority level greater than a second priority level, and the air vehicle has the second priority level;
not perform the collision avoidance control when the specified type is the second type, the other air vehicle has the second priority level, and the air vehicle has the first priority level;
controls the flight of the air vehicle in accordance with a first flight plan in which a flight path and a flight period of the air vehicle are described;
acquire, from a server apparatus, a second flight plan in which a flight path and a flight period of the other air vehicle are described, and a priority level of a flight purpose in the second flight plan;
specify the second type as the type of the other air vehicle when the second flight plan and the priority level are acquired;
when the second type is specified, and flight paths overlap at the same time between the first flight plan and the second flight plan, determine that there is the possibility that the air vehicle and the other air vehicle will collide;
when the second type is specified, and it is determined that there is the possibility of collision, avoid collision with the other air vehicle by controlling the flight of the air vehicle according to a relationship between the acquired priority level and a priority level of a flight purpose in the first flight plan;
acquire status information indicating a flight status of the other air vehicle from the server apparatus;
when the second flight plan, the priority level, and the status information are acquired, and the status information indicates that the other air vehicle is deviating from the second flight plan, specify a third type to which the other vehicle belongs if the other air vehicle is under the predetermined management but flies deviating from the flight plan;
when the third type is specified, and the measured movement direction is a direction approaching the air vehicle, determine that there is the possibility that the air vehicle and the other air vehicle will collide, regardless of the second flight plan; and
when the third type is specified, and it is determined that there is the possibility of collision, avoid collision with the other air vehicle by controlling the flight of the air vehicle, regardless of the priority level.

2. The flight control apparatus according to claim 1, wherein the processor is further configured to:
when a predetermined condition is satisfied, specify a first type as the type of the other air vehicle to which the other vehicle belongs if the other air vehicle is not under the predetermined management, when the first type is specified, and the measured movement direction is a direction approaching the air vehicle, determine that there is the possibility that the air vehicle and the other air vehicle will collide, and when the first type is specified, and it is determined that there is the possibility of collision, avoid collision with the other air vehicle by controlling the flight of the air vehicle.

3. The flight control apparatus according to claim 2, wherein the processor is further configured to:

control the flight of the air vehicle in accordance with a first flight plan in which a flight path and a flight period of the air vehicle are described, acquire, from a server apparatus, a second flight plan in which a flight path and a flight period of the other air vehicle are described, and a priority level of a flight purpose in the second flight plan, specify the second type as the type of the other air vehicle when the second flight plan and the priority level are acquired, when the second type is specified, and flight paths overlap at the same time between the first flight plan and the second flight plan, determine that there is the possibility that the air vehicle and the other air vehicle will collide, and when the second type is specified, and it is determined that there is the possibility of collision, avoid collision with the other air vehicle by controlling the flight of the air vehicle according to a relationship between the acquired priority level and a priority level of a flight purpose in the first flight plan.

4. The flight control apparatus according to claim 2, wherein the predetermined condition includes a condition that an identification signal is not received from the other air vehicle.

5. The flight control apparatus according to claim 1, wherein the processor is further configured to:

receive an identification signal from the other air vehicle, transmit the received identification signal to the server apparatus.

6. The flight control apparatus according to claim 1, wherein the processor is further configured to:

transmit, to the server apparatus, a request inquiring as to whether the other air vehicle is under predetermined management, specify a first type as the type of the other air vehicle when a response indicating that the other air vehicle is not under the predetermined management is received from the server apparatus in response to the request, when the first type is specified, and the measured movement direction is a direction approaching the air vehicle, determine that there is the possibility that the air vehicle and the other air vehicle will collide, and when the first type is specified, and it is determined that there is the possibility of collision, avoid collision with the other air vehicle by controlling the flight of the air vehicle.

7. The flight control apparatus according to claim 5, wherein the processor is further configured to:

transmit, to the server apparatus, a request inquiring as to whether the other air vehicle is under predetermined management, specify a first type as the type of the other air vehicle when a response indicating that the other air vehicle is not under the predetermined management is received from the server apparatus in response to the request, when the first type is specified, and the measured movement direction is a direction approaching the air vehicle, determine that there is the possibility that the air vehicle and the other air vehicle will collide, and when the first type is specified, and it is determined that there is the possibility of collision, avoid collision with the other air vehicle by controlling the flight of the air vehicle.

8. The flight control apparatus according to claim 5, wherein the processor is further configured to:

acquire status information indicating a flight status of the other air vehicle from the server apparatus, when the second flight plan, the priority level, and the status information are acquired, and the status information indicates that the other air vehicle is deviating from the second flight plan, specify a third type to which the other vehicle belongs if the other air vehicle is under the predetermined management but flies deviating from the flight plan, when the third type is specified, and the measured movement direction is a direction approaching the air vehicle, determine that there is the possibility that the air vehicle and the other air vehicle will collide, regardless of the second flight plan, and when the third type is specified, and it is determined that there is the possibility of collision, avoid collision with the other air vehicle by controlling the flight of the air vehicle, regardless of the priority level.

9. The flight control apparatus according to claim 1, wherein the processor is further configured to:

predict a path along which the other air vehicle is to fly, avoid the predicted path by controlling the flight of the air vehicle.

10. The flight control apparatus according to claim 2, wherein the processor is further configured to:

predict a path along which the other air vehicle is to fly, avoid the predicted path by controlling the flight of the air vehicle.

11. The flight control apparatus according to claim 4, wherein the processor is further configured to:

predict a path along which the other air vehicle is to fly, avoid the predicted path by controlling the flight of the air vehicle.

12. The flight control apparatus according to claim 6, wherein the processor is further configured to:

predict a path along which the other air vehicle is to fly, avoid the predicted path by controlling the flight of the air vehicle.

13. The flight control apparatus according to claim 1, wherein the processor is further configured to:

measure the movement direction of the other air vehicle as viewed from the air vehicle at a predetermined time interval, stop in mid-air until the measured movement direction becomes a direction moving away from the air vehicle.

14. The flight control apparatus according to claim 2, wherein the processor is further configured to:

measure the movement direction of the other air vehicle as viewed from the air vehicle at a predetermined time interval, stop in mid-air until the measured movement direction becomes a direction moving away from the air vehicle.

15. A flight control system comprising:
a processor configured to:
detect within a predetermined range of an air vehicle another air vehicle;
specify a type of the detected other air vehicle;

determine a possibility that the air vehicle and the other air vehicle will collide, based on an attribute relating to movement of the other air vehicle;

when it is determined that there is the possibility of collision, perform collision avoidance control to avoid collision with the other air vehicle by controlling flight of the air vehicle according to the specified type;

measure a movement direction of the other air vehicle as viewed from the air vehicle;

perform the collision avoidance control when the specified type is a second type to which the other air vehicle belongs when the other air vehicle is under a predetermined management and flies in accordance with a flight plan, the other air vehicle has a first priority level greater than a second priority level, and the air vehicle has the second priority level;

perform the collision avoidance control when the specified type is the second type, the other air vehicle has the second priority level, and the air vehicle has the first priority level;

control the flight of the air vehicle in accordance with a first flight plan in which a flight path and a flight period of the air vehicle are described;

acquire, from a server apparatus, a second flight plan in which a flight path and a flight period of the other air vehicle are described, and a priority level of a flight purpose in the second flight plan;

specify the second type as the type of the other air vehicle when the second flight plan and the priority level are acquired;

wherein when the second type is specified, and flight paths overlap at the same time between the first flight plan and the second flight plan, determine that there is the possibility that the air vehicle and the other air vehicle will collide;

wherein when the second type is specified, and it is determined that there is the possibility of collision, avoid collision with the other air vehicle by controlling the flight of the air vehicle according to a relationship between the acquired priority level and a priority level of a flight purpose in the first flight plan;

acquire status information indicating a flight status of the other air vehicle from the server apparatus;

wherein when the second flight plan, the priority level, and the status information are acquired, and the status information indicates that the other air vehicle is deviating from the second flight plan, specify a third type to which the other vehicle belongs if the other air vehicle is under the predetermined management but flies deviating from the flight plan;

wherein when the third type is specified, and the measured movement direction is a direction approaching the air vehicle, determine that there is the possibility that the air vehicle and the other air vehicle will collide, regardless of the second flight plan; and wherein when the third type is specified, and it is determined that there is the possibility of collision, avoid collision with the other air vehicle by controlling the flight of the air vehicle, regardless of the priority level.

\* \* \* \* \*